United States Patent
Han

(10) Patent No.: US 11,535,214 B2
(45) Date of Patent: Dec. 27, 2022

(54) SYSTEM OF MODELING ANTI-LOCK BRAKE SYSTEM CONTROLLER OF VEHICLE

(71) Applicants: Hyundai Motor Company, Seoul (KR); Kia Motors Corporation, Seoul (KR)

(72) Inventor: Wook Hyun Han, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 346 days.

(21) Appl. No.: 16/994,820

(22) Filed: Aug. 17, 2020

(65) Prior Publication Data

US 2021/0171004 A1 Jun. 10, 2021

(30) Foreign Application Priority Data

Dec. 10, 2019 (KR) .......... 10-2019-0164122

(51) Int. Cl.

| B60T 8/17 | (2006.01) |
|---|---|
| B60T 8/174 | (2006.01) |
| B60T 8/1761 | (2006.01) |
| B60T 8/171 | (2006.01) |
| G06N 3/04 | (2006.01) |

(52) U.S. Cl.
CPC .............. *B60T 8/174* (2013.01); *B60T 8/171* (2013.01); *B60T 8/1761* (2013.01); *G06N 3/049* (2013.01)

(58) Field of Classification Search
CPC ........ B60T 8/174; B60T 8/171; B60T 8/1761; B60T 8/176; B60T 8/58; B60T 2210/12; B60T 2270/12; G06N 3/049; G06N 3/0445; G06N 3/0454; G06N 3/08; G06F 30/15; G06F 30/27
See application file for complete search history.

(56) References Cited

U.S. PATENT DOCUMENTS

| 2011/0102166 A1* | 5/2011 | Filev ............... B60W 40/09 340/441 |
| 2019/0107163 A1* | 4/2019 | Medinei .............. F16D 66/026 |
| 2021/0065482 A1* | 3/2021 | Panigrahi ............... H04L 12/40 |

FOREIGN PATENT DOCUMENTS

| KR | 10-2006-0068586 A | 6/2006 | |
| KR | 10-2010-0021424 A | 2/2010 | |
| WO | WO-2020006641 A1 * | 1/2020 | ............... B60T 7/22 |

\* cited by examiner

*Primary Examiner* — Mary Cheung
(74) *Attorney, Agent, or Firm* — Fox Rothschild LLP

(57) ABSTRACT

A system of modeling an anti-lock brake system (ABS) controller of a vehicle includes: a vehicle speed estimation network configured to estimate a vehicle speed through machine learning using wheel speed data of each of a plurality of wheels of the vehicle; a wheel speed state estimation network configured to estimate a time series characteristic of the wheel speed through machine learning using information on the wheel speed data and information on whether a brake pedal is depressed; and a classification network configured to estimate a braking mode for controlling an increase, a decrease, or steady state of a braking pressure of each wheel through machine learning using speed estimation data of the vehicle estimated by the vehicle speed estimation network and time series characteristic estimation data of the wheel speed estimated by the wheel speed state estimation network.

15 Claims, 5 Drawing Sheets

SYSTEM OF MODELING ANTI-LOCK BRAKE SYSTEM CONTROLLER OF VEHICLE

CROSS REFERENCE TO RELATED APPLICATION

The present application claims under 35 U.S.C. § 119(a) the benefit of Korean Patent Application No. 10-2019-0164122 filed on Dec. 10, 2019, the entire contents of which are incorporated by reference herein.

BACKGROUND

(a) Technical Field

The present disclosure relates to a system of modeling an anti-lock brake system (ABS) controller of a vehicle, more particularly, to the system of modeling the ABS controller including a deep learning network implemented through machine learning which is performed on the basis of input/output data of the ABS controller of the vehicle to which a private control algorithm is applied.

(b) Description of the Related Art

An integrated virtual vehicle performance analysis system has been constructed that combines vehicle dynamics models, system models, and control models for use in developing and testing of vehicles. The integrated virtual vehicle performance analysis system can examine control performance of the vehicles without changing resources applied to actual vehicles and is capable of significantly reducing time and/or cost of vehicle development.

However, a controller for controlling individual parts of a vehicle is mainly programmed by a manufacturer of those parts, and a logic (algorithm) programmed in the controller typically is not publicly available, so there may be difficulty in establishing a control model of the integrated virtual vehicle performance analysis system. For example, when control performance is examined after an ABS of a vehicle is changed, since an internal logic of the controller provided by an ABS manufacturer is not publicly released, control modeling is not possible in the integrated vehicle virtual performance analysis system. Accordingly, after the ABS is changed in the actual vehicle, performance is inevitably tested by performing actual vehicle driving in various driving environments, and thus the development cost and time may be increased due to the necessity of performing performance tests through actual vehicle driving.

In particular, as advanced driver assistance systems and autonomous driving of a vehicle are increasingly incorporated into vehicles, there is a need for a technique for appropriately modeling a controller in a state of a black box so as to examine a vehicle system and overall control performance thereof in a virtual environment through the integrated virtual vehicle performance analysis system.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a system of modeling an anti-lock brake system (ABS) controller of a vehicle, which is capable of accurately estimating an operation of an ABS controller of a vehicle using deep learning network implemented through machine learning on the basis of input/output data of the ABS controller of the vehicle to which a private control algorithm is applied.

In particular, the present disclosure proposes a system of modeling an ABS controller of a vehicle, which does not require processing data other than each wheel speed, which is input to an actual vehicle ABS controller.

According to one aspect, there is provided a system of modeling an anti-lock brake system (ABS) controller of a vehicle, which includes a vehicle speed estimation network configured to estimate a vehicle speed through machine learning using wheel speed data of each of a plurality of wheels of a vehicle, a wheel speed state estimation network configured to estimate a time series characteristic of the wheel speed through machine learning using information on the wheel speed data and information on vehicle whether a brake pedal of the vehicle is depressed, and a classification network configured to estimate a braking mode for controlling an increase, a decrease, or steady state of a braking pressure of each wheel through machine learning using speed estimation data of the vehicle estimated by the vehicle speed estimation network and time series characteristic estimation data of the wheel speed estimated by the wheel speed state estimation network.

In one embodiment of the present disclosure, the system may further include a concatenate layer configured to concatenate the speed estimation data estimated by the vehicle speed estimation network with the time series characteristic estimation data of the wheel speed estimated by the wheel speed state estimation network to provide the concatenated data to the classification network.

In one embodiment of the present disclosure, the vehicle speed estimation network may be a deep learning network having a plurality of one-dimensional convolution layers configured to receive wheel speed data of each wheel of the vehicle and extract a feature corresponding to the vehicle speed from the received wheel speed data.

In one embodiment of the present disclosure, the wheel speed data input to the vehicle speed estimation network may be obtained by sequentially measuring several times each wheel speed for each wheel of the vehicle at predetermined time intervals.

In one embodiment of the present disclosure, the wheel speed state estimation network may include a plurality of long short term memory (LSTM) networks configured to perform machine learning using a plurality of pieces of wheel speed data sequentially measured at the predetermined time intervals for each wheel of the vehicle and information on whether a brake pedal of the vehicle is depressed.

In one embodiment of the present disclosure, each of the plurality of LSTM networks may estimate data on an increase or decrease state of each wheel speed as the time series characteristic.

In one embodiment of the present disclosure, the classification network may include at least one fully connected (FC) layer configured to perform machine learning for estimating a braking mode of each wheel using the speed estimation data of the vehicle estimated by the vehicle speed estimation network and the time series characteristic estimation data of the wheel speed estimated by the wheel speed state estimation network.

In one embodiment of the present disclosure, the system may further include an output layer configured to use a softmax function, which outputs an output value of the at least one FC layer as a probability value for increasing/ decreasing/maintaining the braking pressure of each wheel, as an activation function.

In one embodiment of the present disclosure, the classification network may set learning importance when the braking pressure of the wheel is decreased during the machine learning to be higher than that when the braking pressure of the wheel is maintained.

In one embodiment of the present disclosure, when the braking pressure of the wheel is decreased or maintained at steady state during the machine learning, the classification network may perform the machine learning, and when the output estimated value does not correspond to the decrease or the steady state of the braking pressure of the wheel, the classification network may determine the output estimated value as the increase of the braking pressure of the wheel.

According to another aspect, there is provided a system of modeling an anti-lock brake system (ABS) controller of a vehicle, which includes a vehicle speed estimation network including a plurality of one-dimensional convolution layers configured to estimate a vehicle speed through machine learning using data obtained by sequentially measuring several times a wheel speed for each wheel of a vehicle at predetermined time intervals, a wheel speed state estimation network including a plurality of long short term memory (LSTM) networks configured to estimate a in a time-series manner characteristic of the wheel speed through machine learning using a plurality of pieces of wheel speed data sequentially measured at the predetermined time intervals for each wheel of the vehicle and information on whether a brake pedal of the vehicle is depressed, a concatenate layer configured to concatenate the speed estimation data estimated by the vehicle speed estimation network with the time series characteristic estimation data of the wheel speed estimated by the wheel speed state estimation network to provide the concatenated data to the classification network, and a classification network including at least one fully connected (FC) layer configured to estimate a braking mode for controlling an increase, a decrease, or steady state of a braking pressure of each wheel through machine learning using the speed estimation data of the vehicle and the time series characteristic estimation data of the wheel speed, which are provided from the concatenate layer.

In one embodiment of the present disclosure, each of the plurality of LSTM networks may estimate data on an increase or decrease state of each wheel speed as the time series characteristic.

In one embodiment of the present disclosure, the system may further include an output layer configured to use a softmax function, which outputs an output value of the at least one FC layer as a probability value for increasing/ decreasing/maintaining the braking pressure of each wheel, as an activation function.

In one embodiment of the present disclosure, the classification network may set learning importance when the braking pressure of the wheel is decreased during the machine learning to be higher than that when the braking pressure of the wheel is maintained.

In one embodiment of the present disclosure, when the braking pressure of the wheel is decreased or maintained at steady state during the machine learning, the classification network may perform the machine learning, and when the output estimated value does not correspond to the decrease or the steady state of the braking pressure of the wheel, the classification network may determine the output estimated value as the increase of the braking pressure of the wheel.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system of modeling an anti-lock brake system (ABS) controller of a vehicle according to various embodiments of the present disclosure will be described in more detail with reference to the accompanying drawings.

Figure 1:
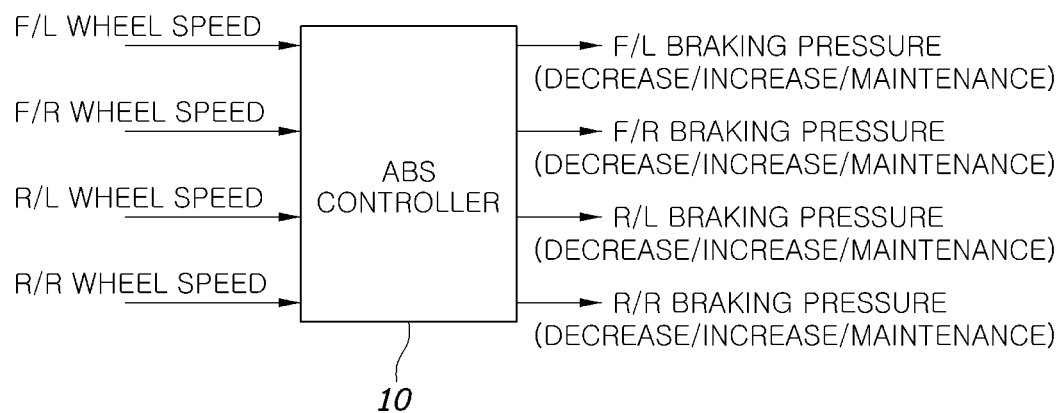
FIG. 1 is a diagram illustrating an example of an anti-lock brake system (ABS) controller of a vehicle to which a system of modeling an ABS controller of a vehicle according to one embodiment of the present disclosure is applied.

FIG. 1 is a diagram illustrating an example of an ABS controller of a vehicle to which a system of modeling an ABS controller of a vehicle and a method thereof according to one embodiment of the present disclosure is applied. In FIG. 1, a term "F/L" is an abbreviation of "front/left" and means a front left wheel of a vehicle, and a term "F/R" is an abbreviation of "front/right" and means a front right wheel of the vehicle. Further, a term "R/L" is an abbreviation of "rear/left" and means a rear left wheel of the vehicle, and a term "R/R" is an abbreviation of "rear/right" and means a rear right wheel of the vehicle.

As shown in FIG. 1, an ABS controller 10 receives a wheel speed of each wheel from a wheel speed sensor (not shown) installed in each wheel of a vehicle and provides a signal for adjusting a hydraulic pressure or a pneumatic pressure (braking pressure) of a brake cylinder installed at each wheel. Basically, in order to prevent a wheel from being locked when a slip ratio is large during braking of the vehicle, the ABS is a system for controlling a braking pressure of a brake according to a vehicle speed and adhesion ability between a road surface and a tire.

Accordingly, the ABS controller 10 includes an algorithm for generating a pressure control signal for controlling an appropriate braking pressure on the basis of each wheel speed being input. The algorithm may include a logic for calculating the slip ratio of the vehicle, a state of the road surface (friction coefficient), and a speed of the vehicle and output a braking mode of each wheel, i.e., a signal for an increase/decrease/steady state of the braking pressure on the basis of input wheel speed information and various pieces of calculated different information. As described herein, "steady state," "maintenance," or "maintaining" braking pressure refers to braking pressure that is unchanged. In the description of various embodiments of the present disclosure, the expression "braking mode" means a mode for performing one control among an increase, a decrease, and a steady state of a braking pressure of a brake provided in each wheel. That is, the meaning of "determining the braking mode" may be understood as a meaning for determining to perform one control among an increase, a decrease, and a steady state of a braking pressure of each wheel.

An ABS operation algorithm or logic implemented by the ABS controller 10 is programmed and stored in the ABS controller 10 so as to implement a unique technique for each manufacturer. Each manufacturer typically does not release to the public, or otherwise make available a specific ABS operating algorithm or logic that is programmed, but instead such information typically is kept confidential, e.g., as a unique know-how.

Therefore, since a control model of a braking system is in a state of a "black box" which is unknown to a vehicle manufacturer, in order to build an integrated virtual vehicle performance analysis system, a technique for analyzing an input signal and an output signal of the ABS controller 10 to accurately model the ABS controller 10 is required.

However, it is very difficult to derive a complicated algorithm executed by the ABS controller 10 by simply analyzing a relationship between a vehicle speed, a wheel speed input to the ABS controller 10, and a brake braking pressure control signal which is output corresponding to the wheel speed.

According to various embodiments of the present disclosure, in order to accurately predict a result output from the complicated algorithm of the ABS controller 10, the system of modeling an ABS controller of a vehicle capable of accurately estimating an output of the ABS controller 10 by learning a deep learning network on the basis of wheel speed information and information on whether a brake pedal is depressed, which are provided to the ABS controller 10, and an output of the ABS controller 10 according to such information.

Figure 2:
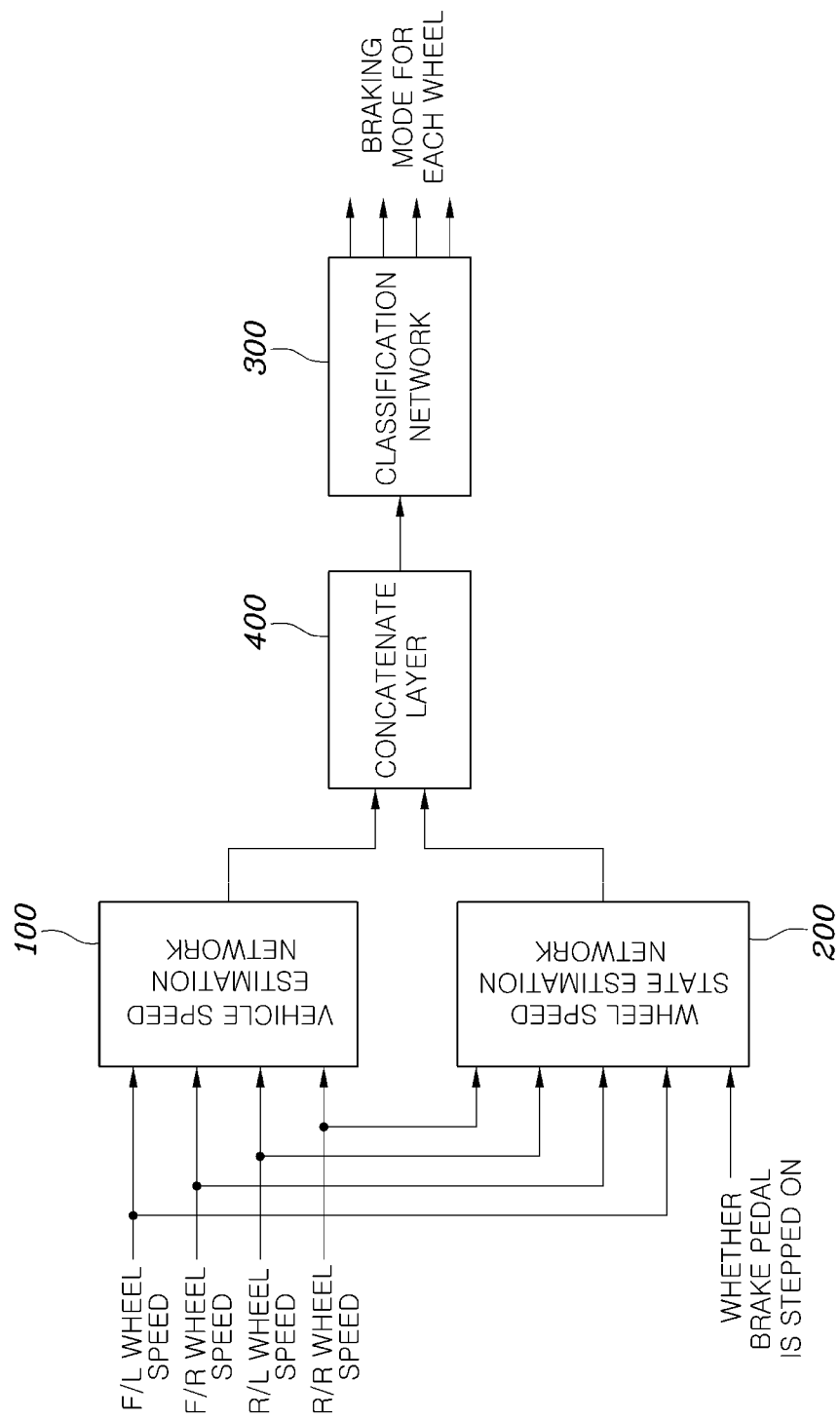
FIG. 2 is a block diagram illustrating the system of modeling an ABS controller of a vehicle according to one embodiment of the present disclosure.

FIG. 2 is a block diagram illustrating the system of modeling an ABS controller of a vehicle according to one embodiment of the present disclosure.

Referring to FIG. 2, the system of modeling an ABS controller of a vehicle according to one embodiment of the present disclosure may include a vehicle speed estimation network 100 for estimating a vehicle speed through machine learning using wheel speed data of each of a plurality of wheels of a vehicle, a wheel speed state estimation network 200 for estimating a time series characteristic of the wheel speed through machine learning using information on the wheel speed data and information on whether a brake pedal is depressed, and a classification network 300 for estimating a braking mode of each of the wheels through machine learning using the vehicle speed estimation data estimated by the vehicle speed estimation network 100 and the time series characteristic estimation data of the wheel speed estimated by the wheel speed state estimation network 200.

In one embodiment of the present disclosure, the system of modeling an ABS controller of a vehicle may further include a concatenate layer 400 for concatenating the vehicle speed estimation data estimated by the vehicle speed estimation network 100 with the time series characteristic estimation data of the wheel speed estimated by the wheel speed state estimation network 200 to provide the concatenated data to the classification network 300.

Figure 3:
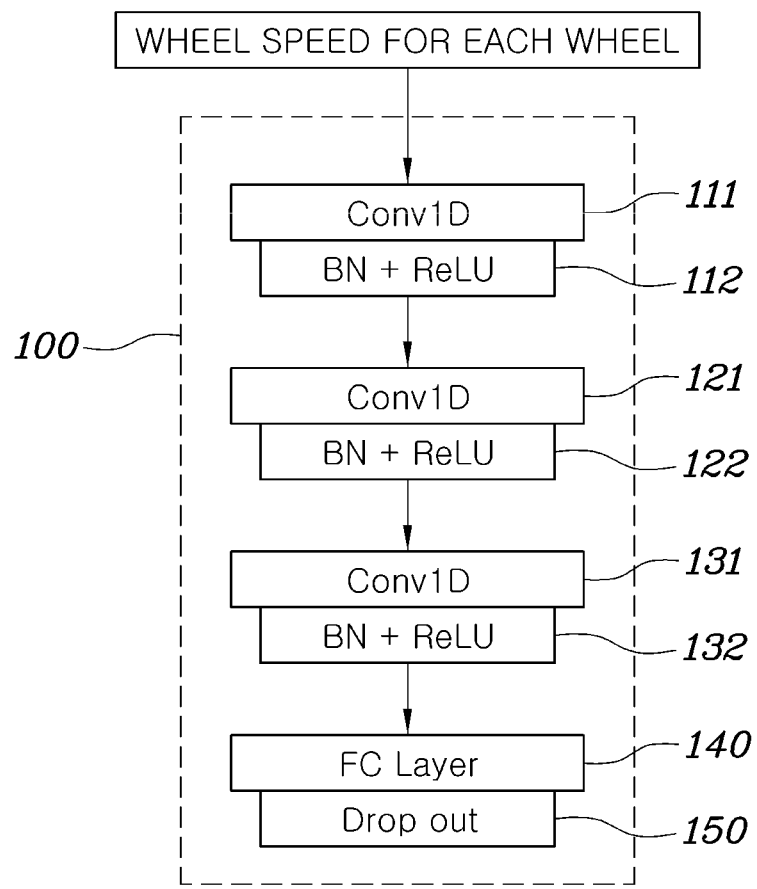
FIG. 3 is a detailed block diagram illustrating a vehicle speed estimation network of the system of modeling an ABS controller of a vehicle according to one embodiment of the present disclosure.

FIG. 3 is a detailed block diagram illustrating a vehicle speed estimation network of the system of modeling an ABS controller of a vehicle according to one embodiment of the present disclosure.

Referring to FIG. 3, the vehicle speed estimation network 100 of the system of modeling an ABS controller of a vehicle according to one embodiment of the present disclosure may be implemented by a deep learning network including a plurality of one-dimensional convolution layers 111, 121, and 131 for receiving the wheel speed data of the wheels of the vehicle and extracting features corresponding to the vehicle speed from the received wheel speed data.

It is preferable that the wheel speed data input to the vehicle speed estimation network 100 is a plurality of pieces of wheel speed data which are sequentially measured at a certain period of time (e.g., a time interval) rather than a plurality of pieces of wheel speed data which are simultaneously measured at one time by a wheel speed sensor (not shown) of the vehicle.

Sensors or controllers provided in the vehicle may operate based on a predetermined constant operating clock. Therefore, the wheel speed sensor for measuring the wheel speed may also measure the wheel speed at the time interval based on the operating clock. It is preferable that the wheel speed data input to the vehicle speed estimation network 100 is a plurality of pieces of wheel speed data which are sequentially measured at the time interval according to the operating clock so as to estimate the vehicle speed in consideration of a time series characteristic of the wheel speed.

For example, when wheel speeds are measured with respect to four wheels, and currently measured wheel speed data for each wheel and nine pieces of previously measured wheel speed data are input, forty pieces of data may be input to the vehicle speed estimation network 100 as one sample.

For example, the plurality of one-dimensional convolution layers 111, 121, and 131 in the vehicle speed estimation network 100 may extract features by applying one-dimensional convolution kernels to the forty pieces of data. Machine learning network applying one-dimensional convolution is a network which is advantageous to extract features of data and may extract features suitable for learning data without an artificial presumption using the wheel speed.

Meanwhile, layers 112, 122, and 132 for performing batch normalization (BN) on and nonlinearizing the values output from the convolution layers 111, 121, and 131 using a rectified linear unit (ReLU) function as an activation function may be added to the vehicle speed estimation network 100. The additional layers 112, 122, and 132 are provided to increase efficiency of machine learning and solve the problem of gradient extinction and are techniques already known in the field of machine learning.

The values output from the plurality of one-dimensional convolutional layers 111, 121, and 131 are transmitted by a fully connected (FC) layer 140. The FC layer 140 finally outputs a vehicle speed estimation value through machine learning which classifies a feature, that is, a value corresponding to the vehicle speed, from the value received from a final layer 131 among the plurality of one-dimensional convolution layers 111, 121, and 131.

Although an example in which three one-dimensional convolution layers 111, 121, and 131 are provided has been illustrated in FIG. 3, the number of one-dimensional convolution layers may be appropriately adjusted in consideration of various learning conditions such as network complexity or a computational speed of a system.

Figure 4:
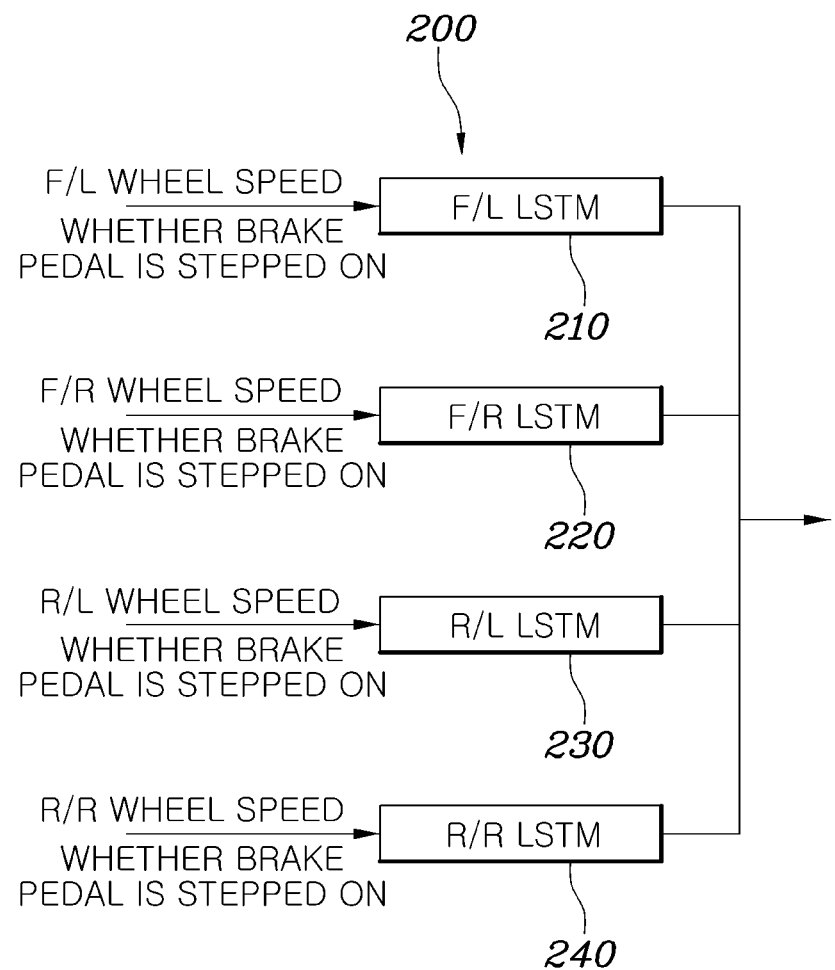
FIG. 4 is a detailed block diagram illustrating a wheel speed state estimation network of the system of modeling an ABS controller of a vehicle according to one embodiment of the present disclosure.

FIG. 4 is a detailed block diagram illustrating a wheel speed state estimation network of the system of modeling an ABS controller of a vehicle according to one embodiment of the present disclosure.

Referring to FIG. 4, the wheel speed state estimation network 200 of the system of modeling an ABS controller of a vehicle according to one embodiment of the present disclosure may include a plurality of long short term memory (LSTM) networks 210, 220, 230, and 240 which learn information on the speed of each wheel and information on whether the brake pedal is depressed as inputs.

The LSTM network is proposed as a network structure which is capable of solving the problem of long-term dependency of a recurrent neural network (RNN) reflecting a time series characteristic and is a deep learning network suitable for estimating a time series characteristic between pieces of data which are sequentially input.

Even for wheel speed values measured at a specific time, all of time series characteristics thereof may be different from each other. Generally, in order to prevent the wheel from being locked when the wheel speed is slower than the vehicle speed, the ABS is known to perform control of decreasing a braking pressure of a corresponding wheel. However, it is preferable to control the braking pressure in consideration that the measured wheel speed has which kind of time series characteristic. For example, even for a wheel speed value measured at a specific time, a characteristic of the wheel speed value may be varied according to the wheel speed value measured at a previous time. That is, in a case in which the wheel speed value measured at the previous time is continuously decelerated and a case in which a wheel speed value is increased because the wheel speed measured at the previous time has a smaller value, a measured wheel speed value may be output different from a result according to braking pressure control of the ABS.

The plurality of LSTM networks 210, 220, 230, and 240 in the wheel speed state estimation network 200 may estimate time series characteristics of wheel speeds through machine learning by sequentially receiving a plurality of wheel speeds and information on whether a brake pedal is depressed for determining whether braking is performed. Here, the time series characteristic may be data on an increase or decrease state of the wheel speed indicating whether the wheel speed is increased or decreased.

Figure 5:
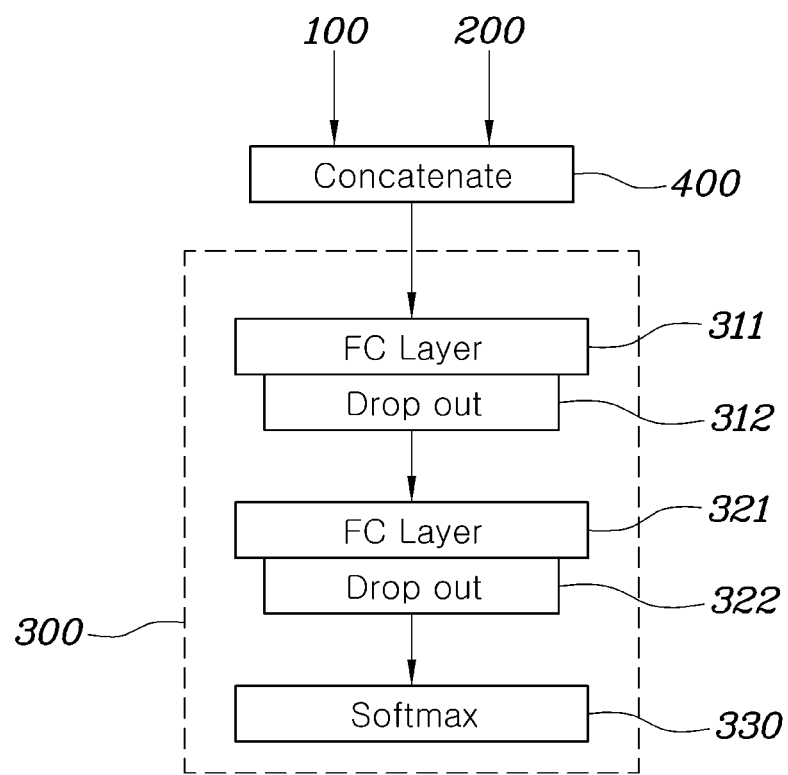
FIG. 5 is a detailed block diagram illustrating a concatenate layer and a classification network of the system of modeling an ABS controller of a vehicle according to one embodiment of the present disclosure.

FIG. 5 is a detailed block diagram illustrating a concatenate layer and a classification network of the system of modeling an ABS controller of a vehicle according to one embodiment of the present disclosure.

The concatenate layer 400 may concatenate the speed estimation data estimated by the vehicle speed estimation network 100 with the time series characteristic estimation data of the wheel speed estimated by the wheel speed state estimation network 200 to provide the concatenated data to the classification network 300 as an input thereof.

The classification network 300 may receive the speed estimation data estimated by the vehicle speed estimation network 100 and the time series characteristic estimation data of the wheel speed estimated by the wheel speed state estimation network 200 from the concatenate layer 400 and perform machine learning for estimating a braking mode of each wheel using the received data.

The classification network 300 may include one or more FC layers 311 and 312 and an output layer 330 which uses a softmax function as an activation function. The FC layers 311 and 312 may perform a control mode of the braking pressure for each wheel, that is, perform machine learning so as to generate data on an increase/decrease/steady state of the braking pressure. The output layer 330 may output values, which are output from the FC layers 311 and 312, as a probability value for the increase/decrease/steady state of the braking pressure of the wheel. To this end, the output layer 330 may apply a softmax function as an activation function. The softmax function is a function that outputs a plurality of inputs as a probability value having the sum of one and a value of zero or one. The output layer 330 may output a probability value for the increase/decrease/steady state of the braking pressure of each wheel through the softmax function. The sum of the probability values for the increase/decrease/steady state of the braking pressure output due to a characteristic of the softmax function may become one. A mode having a largest probability value output from the output layer 330 may become a final result of wheel braking pressure control. The above-described machine learning may be performed by comparing the output result of the braking pressure control mode of the output layer 330 undergoing the machine learning with a result of braking pressure control which is actually performed by the ABS controller 10.

In FIG. 5, reference numerals 312 and 322 indicate that a drop out is performed to reduce complexity and a load of learning.

In particular, in one embodiment of the present disclosure, the classification network 300 may set learning importance when the braking pressure of each wheel is decreased different from learning importance when the braking pressure of the wheel is maintained, thereby solving an imbalance for a difference in the number of pieces of data. When the operating state of the ABS is analyzed, a case in which the braking pressure is maintained is much more than a case in which the braking pressure is decreased. That is, in the data used for the machine learning, the number of pieces of data measured when the braking pressure is maintained is larger than the number of pieces of data measured when the braking pressure is decreased. Owing to such a data imbalance, a result of braking pressure steady state estimated through the machine learning has accuracy that is higher than that of a result of a braking pressure decrease.

Thus, in order to solve a problem of an accuracy deviation due to the data imbalance, in one embodiment of the present disclosure, the machine learning is performed such that the learning importance when the brake pressure of the wheel is decreased is set to be higher than that when the brake pressure of the wheel is maintained so that the problem due to the data imbalance may be solved.

Further, in one embodiment of the present disclosure, the classification network 300 may perform the machine learning for the case in which the braking pressure is decreased and the case in which the braking pressure is maintained. Since the case in which the braking pressure is increased corresponds to a basic operation of the brake, the machine learning may be performed for the cases in which the braking pressure is decreased or maintained, which correspond to control of the ABS, and when a probability for the decrease or steady state of the braking pressure is low, the output layer 330 implemented as a softmax activation function may output an estimated value for increasing the braking pressure.

As described above, the system of modeling an ABS controller according to various embodiments of the present disclosure learns the vehicle speed as the input of the entire time series data on the wheel speed, learns the time series characteristic of the wheel speed (whether the wheel speed is increased or decreased), and then learns so as to estimate a braking mode using the integrated learning results, thereby accurately estimating the vehicle speed and an ABS braking mode by reflecting whether the wheel speed is increased or decreased to the estimated vehicle speed.

Further, the system of modeling an ABS controller according to various embodiments of the present disclosure may set the case in which the braking pressure is decreased to have importance that is higher than that of the case in which the braking pressure is maintained to perform the machine learning is performed, thereby solving a concentration phenomenon in the case in which the machine learning is maintained and deriving a balanced estimated value for each braking pressure control mode (increase/decrease/steady state).

According to a system of modeling an ABS controller, a vehicle speed is learned as an input of an entire time series data on a wheel speed, a time series characteristic of the wheel speed (whether the wheel speed is increased or decreased) is learned, and then the integrated learning results are used to learn so as to estimate a braking pressure so that it is possible to accurately estimate the vehicle speed and an ABS braking pressure by reflecting whether the wheel speed is increased or decreased to the estimated vehicle speed.

Further, according to the system of modeling an ABS controller, a case in which the braking pressure is decreased is set to have importance that is higher than that of a case in which the braking pressure is maintained to perform machine learning is performed so that it is possible to solve a concentration phenomenon in a case in which the machine learning is maintained and derive a balanced estimated value for each braking pressure control mode (increase/decrease/steady state).

The effects obtained by the present disclosure is not limited to the above-mentioned effects and other effects which are not mentioned can be clearly understood by those skilled in the art to which the present disclosure pertains from the following description.

Although the exemplary embodiments of the present disclosure has been described for illustrative purposes, those skilled in the art will appreciate that various modifications, additions and substitutions are possible, without departing from the accompanying claims.

What is claimed is:

1. A system of modeling an anti-lock brake system (ABS) controller of a vehicle, the system comprising:
   a vehicle speed estimation network configured to estimate a vehicle speed through machine learning using wheel speed data of each of a plurality of wheels of the vehicle;
   a wheel speed state estimation network configured to estimate a time series characteristic of the wheel speed through machine learning using information on the wheel speed data and information on vehicle whether a brake pedal is depressed; and
   a classification network configured to estimate a braking mode for controlling an increase, a decrease, or steady state of a braking pressure of each wheel through machine learning using speed estimation data of the vehicle estimated by the vehicle speed estimation network and time series characteristic estimation data of the wheel speed estimated by the wheel speed state estimation network.

2. The system of claim 1, further comprising:
   a concatenate layer configured to concatenate the speed estimation data estimated by the vehicle speed estimation network with the time series characteristic estimation data of the wheel speed estimated by the wheel speed state estimation network to provide the concatenated data to the classification network.

3. The system of claim 1, wherein the vehicle speed estimation network includes a deep learning network having a plurality of one-dimensional convolution layers configured to receive the wheel speed data of each wheel of the vehicle and extract a feature corresponding to the vehicle speed from the received wheel speed data.

4. The system of claim 3, wherein the wheel speed data input to the vehicle speed estimation network is obtained by sequentially measuring several times each wheel speed for each wheel of the vehicle at predetermined time intervals.

5. The system of claim 1, wherein the wheel speed state estimation network includes a plurality of long short term memory (LSTM) networks configured to perform machine learning using a plurality of pieces of the wheel speed data sequentially measured at predetermined time intervals for each wheel of the vehicle and information on whether a brake pedal of the vehicle is depressed.

6. The system of claim 5, wherein each of the plurality of LSTM networks estimates data on an increase or decrease state of each wheel speed as the time series characteristic.

7. The system of claim 1, wherein the classification network includes at least one fully connected (FC) layer configured to perform machine learning for estimating a braking mode of each wheel using the speed estimation data of the vehicle estimated by the vehicle speed estimation network and the time series characteristic estimation data of the wheel speed estimated by the wheel speed state estimation network.

8. The system of claim 7, further comprising:
an output layer configured to use a softmax function, which outputs an output value of the at least one FC layer as a probability value for increasing/decreasing/maintaining the braking pressure of each wheel, as an activation function.

9. The system of claim 7, wherein the classification network sets learning importance when the braking pressure of the wheel is decreased during the machine learning to be higher than that when the braking pressure of the wheel is maintained.

10. The system of claim 7, wherein, when the braking pressure of the wheel is decreased or maintained at steady state during the machine learning, the classification network performs the machine learning, and when the output estimated value does not correspond to the decrease or the steady state of the braking pressure of the wheel, the classification network determines the output estimated value as the increase of the braking pressure of the wheel.

11. A system of modeling an anti-lock brake system (ABS) controller of a vehicle, the system comprising:
a vehicle speed estimation network including a plurality of one-dimensional convolution layers configured to estimate a vehicle speed through machine learning using data obtained by sequentially measuring several times a wheel speed for each wheel of a vehicle at predetermined time intervals;
a wheel speed state estimation network including a plurality of long short term memory (LSTM) networks configured to estimate a time series characteristic of the wheel speed through machine learning using a plurality of pieces of wheel speed data sequentially measured at the predetermined time intervals for each wheel of the vehicle and information on whether a brake pedal of the vehicle is depressed;
a concatenate layer configured to concatenate the speed estimation data estimated by the vehicle speed estimation network with the time series characteristic estimation data of the wheel speed estimated by the wheel speed state estimation network to provide the concatenated data to the classification network; and
a classification network including at least one fully connected (FC) layer configured to estimate a braking mode for controlling an increase, a decrease, or steady state of a braking pressure of each wheel through machine learning using the speed estimation data of the vehicle and the time series characteristic estimation data of the wheel speed, which are provided from the concatenate layer.

12. The system of claim 11, wherein each of the plurality of LSTM networks estimates data on an increase or decrease state of each wheel speed as the time series characteristic.

13. The system of claim 11, further comprising:
an output layer configured to use a softmax function, which outputs an output value of the at least one FC layer as a probability value for increasing/decreasing/maintaining the braking pressure of each wheel, as an activation function.

14. The system of claim 11, wherein the classification network sets learning importance when the braking pressure of the wheel is decreased during the machine learning to be higher than that when the braking pressure of the wheel is maintained.

15. The system of claim 11, wherein, when the braking pressure of the wheel is decreased or maintained at steady state during the machine learning, the classification network performs the machine learning, and when the output estimated value does not correspond to the decrease or the steady state of the braking pressure of the wheel, the classification network determines the output estimated value as the increase of the braking pressure of the wheel.

* * * * *